United States Patent
Chang et al.

(10) Patent No.: US 10,861,466 B2
(45) Date of Patent: Dec. 8, 2020

(54) METHOD AND APPARATUS FOR PACKET LOSS CONCEALMENT USING GENERATIVE ADVERSARIAL NETWORK

(71) Applicant: INDUSTRY-UNIVERSITY COOPERATION FOUNDATION HANYANG UNIVERSITY, Seoul (KR)

(72) Inventors: Joon-Hyuk Chang, Seoul (KR); Bong-Ki Lee, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 196 days.

(21) Appl. No.: 16/059,157

(22) Filed: Aug. 9, 2018

(65) Prior Publication Data
US 2019/0051310 A1    Feb. 14, 2019

(30) Foreign Application Priority Data
Aug. 10, 2017  (KR) .................. 10-2017-0101766

(51) Int. Cl.
| | |
|---|---|
| G10L 19/005 | (2013.01) |
| H04L 29/06 | (2006.01) |
| G10L 25/30 | (2013.01) |
| G10L 19/16 | (2013.01) |

(52) U.S. Cl.
CPC .......... G10L 19/005 (2013.01); G10L 19/167 (2013.01); G10L 25/30 (2013.01); H04L 65/607 (2013.01); H04L 65/80 (2013.01)

(58) Field of Classification Search
USPC ........................................ 704/202, 226–228
See application file for complete search history.

(56) References Cited

PUBLICATIONS

Pascual et al., SEGAN: Speech Enhancement Generative Adversarial Network; Jun. 9, 2017.*
Yang et al., Statistical parametric speech synthesis using generative adversarial networks under a multi-task learning framework; 2017.*
Bong-Ki Lee, et al. Packet loss concealment based on deep neural networks for digital speech transmission. IEEE Transactions on Audio, Speech, and Language Processing. Feb. 2016.
Ian J. Goodfellow, et al. Generative adversarial nets. Advances in neural information processing systems. 2014.

* cited by examiner

*Primary Examiner* — Leonard Saint Cyr

(57) ABSTRACT

Disclosed are a packet loss concealment method and apparatus a using a generative adversarial network. A method for packet loss concealment in voice communication may include training a classification model based on a generative adversarial network (GAN) with respect to a voice signal including a plurality of frames, training a generative model having a contention relation with the classification model based on the GAN, estimating lost packet information based on the trained generative model with respect to the voice signal encoded by a codec, and restoring a lost packet based on the estimated packet information.

14 Claims, 6 Drawing Sheets

METHOD AND APPARATUS FOR PACKET LOSS CONCEALMENT USING GENERATIVE ADVERSARIAL NETWORK

CROSS REFERENCE TO RELATED APPLICATION

The present application claims priority under 35 U.S.C 119(a) to Korean Patent Application No. 10-2017-0101766 filed in the Korean Intellectual Property Office on Aug. 10, 2017, the entire contents of which are incorporated herein by reference.

BACKGROUND

1. Technical Field

Embodiments of the present disclosure relate to a packet loss concealment technology for restoring a lost packet of a voice signal by estimating the packet lost upon voice communication.

2. Description of the Related Art

In a voice communication system, such as voice over Internet service (VoIP), a packet loss in which a packet is lost during communication frequently occurs. Voice call quality is significantly reduced due to the packet loss. Such a packet loss may be compensated for using a packet loss concealment algorithm. In a conventional technology, a packet loss concealment algorithm proposed in G.722 Appendix IX standardized by ITU-T is commonly used.

The following non-patent document [1] B.-K. Lee and J.-H. Chang, "Packet loss concealment based on deep neural networks for digital speech transmission," IEEE Transactions on Audio, Speech, and Language Processing, Vol. 24, No. 2, pp. 378-387, February 2016, relates to a packet loss concealment technology using a deep neural network (DNN). The document describes a technology for applying a feature vector extracted from packets prior to a packet loss to a session-based DNN model and concealing a packet loss by estimating the feature vector of a lost packet. As described above, when the feature vector of the lost packet is estimated using the DNN, if the estimation of the feature vector fails, there is a limit in that a sound untenable to a person is generated and provided. To simply copy and modify a feature vector indicative of the characteristic of a previous signal has low performance in packet loss concealment.

Korean Patent Application Publication No. 10-1452635 relates to a packet loss concealment method using an LMS predictor and a recording medium on which the method is recorded. The patent discloses a packet loss concealment technology for enhancing sound quality by improving a phenomenon in which a gain value is reduced when continuous losses occur using a value predicted using the LMS predictor as a gain value of a lost packet.

SUMMARY

An embodiment of the present disclosure is to compensate for a loss through packet loss concealment when a packet loss occurs in voice communication.

A method for packet loss concealment in voice communication may include training a classification model based on a generative adversarial network (GAN) with respect to a voice signal including a plurality of frames, training a generative model having a contention relation with the classification model based on the GAN, estimating lost packet information based on the trained generative model with respect to the voice signal encoded by a codec, and restoring a lost packet based on the estimated packet information.

In an aspect, the classification model may determine whether data corresponding to an input signal is data corresponding to a real voice signal or data corresponding to a voice signal generated through the generative model.

In another aspect, training the generative model may include training the generative model to classify data generated through the generative model as data corresponding to a real voice signal in the classification model.

In yet another aspect, training the classification model may include training the classification model to classify data generated through the generative model as fake data not data corresponding to a real voice signal through the training.

In yet another aspect, training the classification model may include training the classification model to classify data corresponding to a frame before a packet is lost as real data and classify data of a lost packet estimated based on the generative model as fake data with respect to the voice signal.

In yet another aspect, the classification model and the generative model may be trained based on a convolutional neural network.

In yet another aspect, estimating the lost packet information may include setting a specific number of previous frames predetermined prior to a target frame comprising a lost packet from among the plurality of frames as an input to the generative model, setting the target frame as an output of the generative model, and estimating the lost packet information.

In yet another aspect, the lost packet may be restored based on a fast Fourier transform (FFT) coefficient and phase extracted from each of a specific number of previous frames predetermined prior to a target frame including a lost packet from among the plurality of frames and the trained generative model.

An apparatus for packet loss concealment in voice communication may include a classification model training unit configured to train a classification model based on a generative adversarial network (GAN) with respect to a voice signal including a plurality of frames, a generative model training unit configured to train a generative model having a contention relation with the classification model based on the GAN, and a restoration unit configured to estimate lost packet information based on the trained generative model with respect to the voice signal encoded by a codec and to restore a lost packet based on the estimated packet information.

In an aspect, the classification model may determine whether data corresponding to an input signal is data corresponding to a real voice signal or data corresponding to a voice signal generated through the generative model.

In another aspect, the generative model training unit may train the generative model to classify data generated through the generative model as data corresponding to a real voice signal in the classification model.

In yet another aspect, the generative model training unit may train the classification model to classify data generated through the generative model as fake data not data corresponding to a real voice signal through the training.

In yet another aspect, the classification model training unit may train the classification model to classify data corresponding to a frame before a packet is lost as real data and to classify data of a lost packet estimated based on the generative model as fake data with respect to the voice signal.

In yet another aspect, the classification model and the generative model may be trained based on a convolutional neural network.

In yet another aspect, the lost packet may be restored based on a fast Fourier transform (FFT) coefficient and phase extracted from each of a specific number of previous frames predetermined prior to a target frame including a lost packet from among the plurality of frames and the trained generative model.

DETAILED DESCRIPTION

Figure 1:
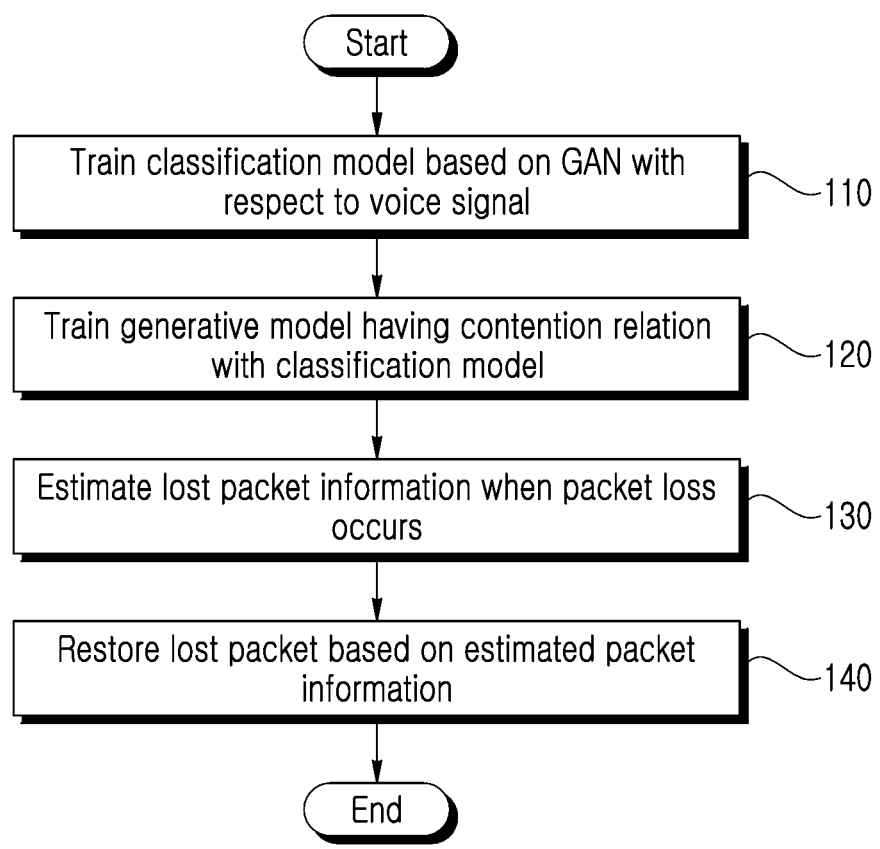
FIG. 1 is a flowchart showing a method for packet loss concealment based on a GAN in an embodiment of the present disclosure.

Hereinafter, embodiments of the present disclosure are described in detail with reference to the accompanying drawings.

An embodiment of the present disclosure relates to a packet loss concealment technology for compensating for a loss of a packet lost during communication in a voice communication system, such as voice over Internet service (VoIP) and relates to a technology for performing packet loss concealment using a generative adversarial network (GAN). Specifically, an embodiment of the present disclosure relates to a technology for restoring a lost packet by improving performance of a generative model and a classification model that are adversarial by training the two models competitively and finally maximizing performance of the generative model. That is, an embodiment of the present disclosure relates to a technology for restoring a lost packet by training the classification model separately from the generative model not the training of the generative model only.

In the present embodiments, a "classification model" may indicate a model used to identify or determine whether data corresponding to an input signal is data corresponding to a real voice signal (i.e., real data) or data corresponding to a voice signal (i.e., fake data) generated through the generative model.

In the present embodiments, a "generative model" is a model used to generate data that is similar to a voice signal or almost the same as a voice signal of a predetermined criterion or more, and may be used to restore (i.e., generate/compensate for) the data of a lost packet.

In the present embodiments, a generative adversarial network (GAN) is a model for training a generator and a discriminator through a contention. A "generative model" and a "classification model" have a contention relation, and they may be trained based on real data (i.e., a real voice signal) and fake data (e.g., a voice signal generated by the generative model) in a pre-processing step for packet loss concealment. In this case, the training of a classification model may be performed in such a way as to classify data generated by a generative model as fake data. The training of a generative model may be performed in such a way as to classify data, generated by the generative model, as real data in a classification model. That is, the generative model and the classification model may be trained competitively based on an adversarial relation.

In the present embodiments, not frequency-based feature vector extraction, but time area-based feature vector extraction may be used for feature vector extraction. For example, in the frequency-based feature vector extraction, unnatural voice synthesis is present due to a mismatch between the size and the phase because the size area and phase area of a frequency are separately estimated. In contrast, if the time area-based feature vector extraction is used, a mismatch may not occur between the size and the phase because voice synthesis is performed by taking the size and phase into consideration at once. That is, a lost packet may be restored to a natural voice signal close to a real voice.

In the present embodiments, a fast Fourier transform (FFT) coefficient and a phase are illustrated as being extracted as a feature vector from a frame, but this is an embodiment. A short time Fourier transform (STFT) coefficient other than the FFT coefficient may be used as a feature vector.

Figure 2:
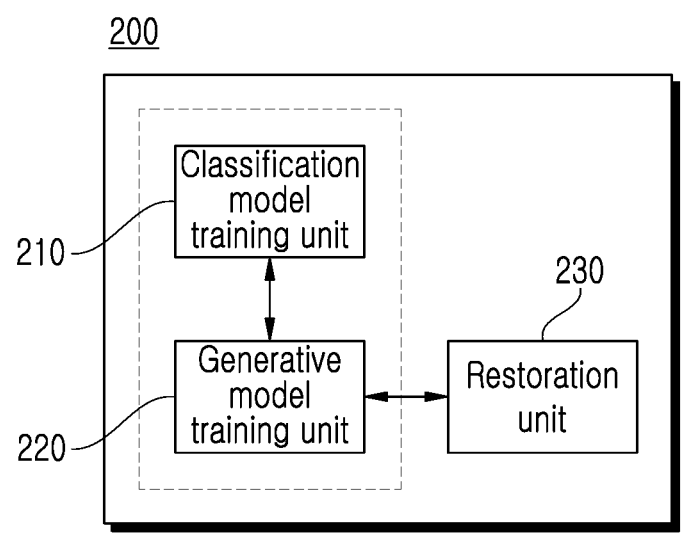
FIG. 2 is a block diagram showing the internal configuration of an apparatus for packet loss concealment based on a GAN in an embodiment of the present disclosure.

FIG. 1 is a flowchart showing a method for packet loss concealment based on the GAN in an embodiment of the present disclosure. FIG. 2 is a block diagram showing the internal configuration of an apparatus for packet loss concealment based on the GAN in an embodiment of the present disclosure.

Referring to FIG. 2, the apparatus 200 for packet loss concealment may include a classification model training unit 210, a generative model training unit 220 and a restoration unit 230. In FIG. 1, steps 110 to 140 may be performed by the classification model training unit 210, the generative model training unit 220 and the restoration unit 230, that is, the elements of FIG. 2.

In step 110, the classification model training unit 210 may train a classification model based on the GAN with respect to a voice signal including a plurality of frames. In this case, the classification model training unit 210 may train the classification model to classify real data, that is, data corresponding to a real voice signal, and fake data, that is, data generated through the generative model.

For example, the classification model training unit 210 may set a label in which data before a packet is lost is real data and the data of a lost packet estimated through the generative model is fake data with respect to a voice signal obtained in voice communication, and may train the classification model to classify the data as real data or fake data.

In step 120, the generative model training unit 220 may train the generative model having a contention relation with the classification model based on the GAN. In this case, the generative model training unit 220 may train the generative model so that data generated through the generative model is classified as data corresponding to a real voice signal in the classification model, that is, real data. For example, a convolutional neural network may be used for the training of the generative model and the classification model.

In step 130, when a packet loss occurs with respect to a voice signal including a plurality of frames, the restoration unit 230 may estimate lost packet information.

For example, when a packet loss occurs in a specific one of frames forming a voice signal encoded by a codec, the restoration unit 230 may estimate lost packet information based on a trained generative model.

In step 140, the restoration unit 230 may restore the lost packet based on the estimated packet information. For example, the restoration unit 230 may restore the lost packet through voice signal synthesis.

For example, the restoration unit 230 may restore a lost packet based on a feature vector extracted from a predefined number of previous frames input to the generative model before the packet loss occurs.

Figure 3:
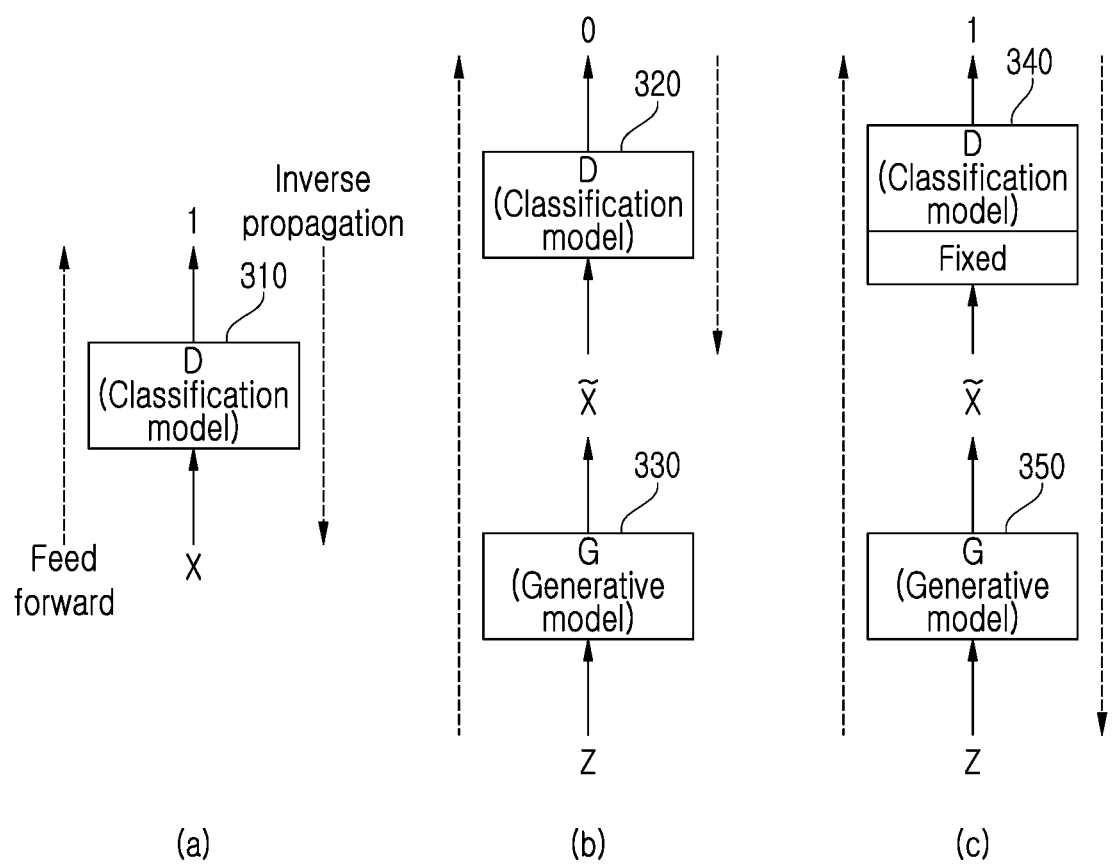
FIG. 3 is a diagram showing the structure of the GAN in an embodiment of the present disclosure.

FIG. 3 is a diagram showing the structure of the GAN in an embodiment of the present disclosure.

Referring to FIG. 3, the GAN may include a classification model D and a generative model G.

The classification model training unit 210 may set time area data X for a packet before the packet is lost as an input parameter of a classification model G 310 with respect to a real voice signal, may set a predetermined output value (e.g., 1) as a label so that the time area data X is classified as real data, and may train a classification model. That is, the classification model training unit 210 may perform training so that the classification model D 310 classifies the real data X, that is, data before a real packet loss occurs, as 1. Furthermore, the classification model training unit 210 may perform training so that a classification model D 320 classifies fake data (e.g., estimated data of lost packet information) $\tilde{X}$ generated by a generative model G 330 as 0. In this case, a time area data Z for a frame prior to the lost packet may be used as an input to the generative model G 330. The generative model G 330 may restore the lost packet by estimating packet information corresponding to a lost frame based on feature vectors extracted from a predetermined number of previous frames (i.e., frames input to the generative model before the packet loss occurs). Accordingly, the fake data $\tilde{X}$ including the restored packet is received from the generative model G 330 to the classification model D 320 again. The classification model G 320 may perform training to classify the corresponding data $\tilde{X}$ as 0. The generative model G 330 may perform training so that the classification model D 320 generates data $\tilde{X}$ that makes the fake data $\tilde{X}$ classified as 1 like real data. In this case, $\tilde{X}$ is fake data estimated from the lost time area data through the generative model, and may also be expressed as estimated time area data.

In other words, after the classification model D and the generative model G are sufficiently trained to a preset training level or more, the classification model training unit 210 may fix the parameter of a classification model D 340. After the parameter is fixed, the generative model G 350 may be trained so that fake data generated by a generative model G 350 is determined to be 1 in the classification model D 350 as much as possible.

In this case, in order to perform training so that the classification model D classifies the real data X as 1 and classifies the fake data $\tilde{X}$, that is, data generated by the generative model G, as 0, a loss function (i.e., an objective function) for each model may be used. For example, the classification model training unit 210 may perform training so that a classification model classifies the input X as a 1 and classifies the input $\tilde{X}$ as 0 based on a loss function for the classification model D defined in Equation 1.

$$\min_D V_{LSGAN}(D) = \quad \text{[Equation 1]}$$
$$\frac{1}{2}E_{x \sim p_{data}(x)}[(D(x)-1)^2] + \frac{1}{2}E_{z \sim p_z(z)}[(D(G(z)))^2]$$

Furthermore, the generative model training unit 220 may train a generative model so that the classification model D generates fake data $\tilde{X}$ that makes fake data $\tilde{X}$ generated by the generative model classified as 1 based on a loss function (i.e., an objective function) for the generative model G defined in Equation 2.

$$\min_G V_{LSGAN}(G) = \quad \text{[Equation 2]}$$
$$\frac{1}{2}E_{x \sim p_{data}(x), z \sim p_z(z)}[(D(G(z))-1)^2] + \lambda \|G(z, \tilde{x}) - x\|_1$$

In Equation 1 and Equation 2, the LSGAN may indicate the least square GAN. $x \sim p_{data}$ is real data and may indicate data that needs to be classified as 1. $z \sim p_z(z)$ is fake data generated by the generative model G and may indicate data that needs to be classified as 0.

Figure 4:
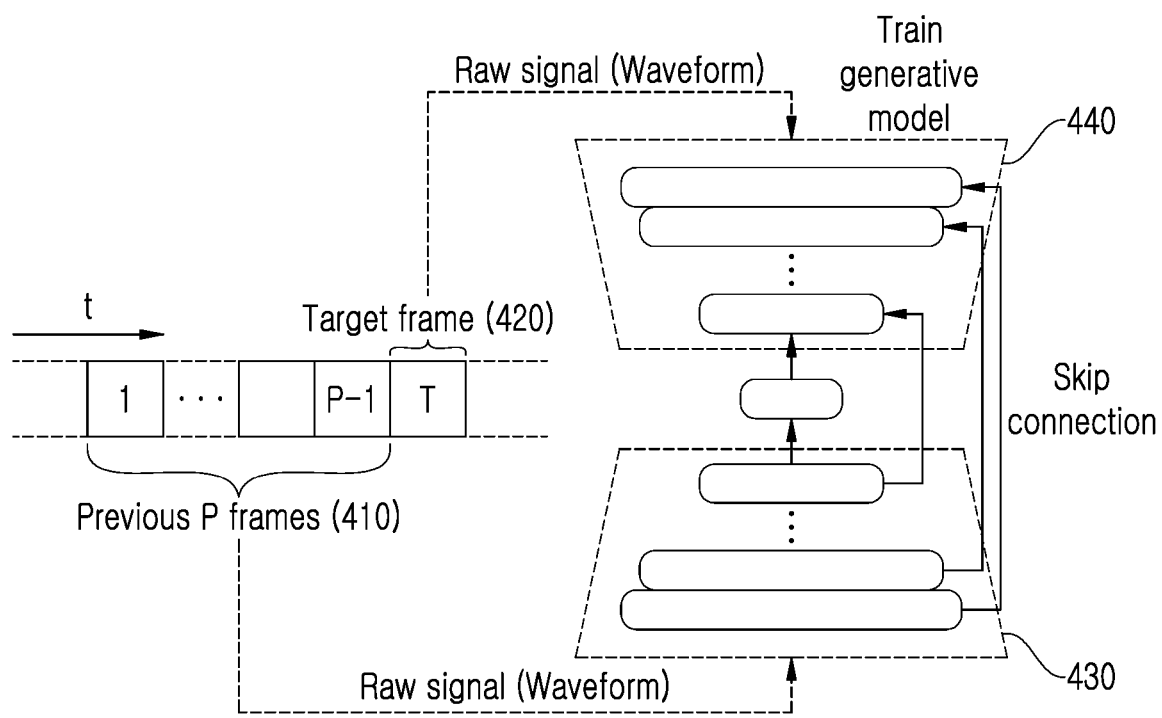
FIG. 4 is a diagram showing a structure for training a generative model in an embodiment of the present disclosure.

FIG. 4 is a diagram showing a structure for training a generative model in an embodiment of the present disclosure.

Referring to FIG. 4, a voice signal may include a plurality of frames. A target frame 420 may indicate a frame including a packet in which a loss has occurred. Furthermore, frames (e.g., a predetermined number of P previous frames 410) before the packet loss occurs may be set as an input to the generative model G, the target frame 420 may be set as the output of the generative model G, and training may be performed. Accordingly, when a real target frame is lost, information of the lost target frame may be restored (i.e., generated) based on information of the P previous frames (e.g., feature vectors extracted from the P frames).

In this case, the generative model G may be configured using a convolutional neural network (CNN). The CNN may include a convolutional product layer 430 playing a role as an encoder and an inverse convolutional product layer 440 playing a role as a decoder. That is, the convolutional product layer 430 and the inverse convolutional product layer 440 may have a symmetrical structure. In this case, a waveform in which the final lost packet is concealed may be restored at the top of the decoder. A skip connection may be performed so that the training of the CNN is well performed on a generative model.

For example, 16-bit data itself having the signal of a time area may be used as a feature vector. For example, in the training step, the P previous frames may be set as an input to the generative model G, and the input may correspond to feature vectors extracted from the P previous frames 410, respectively. In this case, the feature vector may include an FFT coefficient and a phase. That is, the FFT coefficients and phases extracted from the P previous frames (i.e., the P frames 410 before a loss occurs) may be set as the input parameters of the generative model G. Furthermore, a feature vector (i.e., FFT coefficient and phase) extracted from the target frame 420 that is a next frame of the P previous frames 410 from which the feature vectors have been extracted, that is, a frame in which a packet loss has occurred, may be set as a target feature vector, and the generative model G may be trained.

When a packet loss actually occurs in at least one of a plurality of frames forming a voice signal received through a codec, the restoration unit 230 may restore the lost packet based on the trained generative model G. For example, when a target frame is lost, the restoration unit 230 may generate the FFT coefficients and phases of the lost frame (i.e., target frame) based on feature vectors extracted from the respective P frames before the loss occurs and a target frame corresponding to a lost packet based on the trained generative model G. That is, the restoration unit 230 may restore a waveform in which the lost packet has been concealed (i.e., a voice signal waveform having a concealed lost packet) based on the FFT coefficient and phase of a generated target frame.

Figure 5:
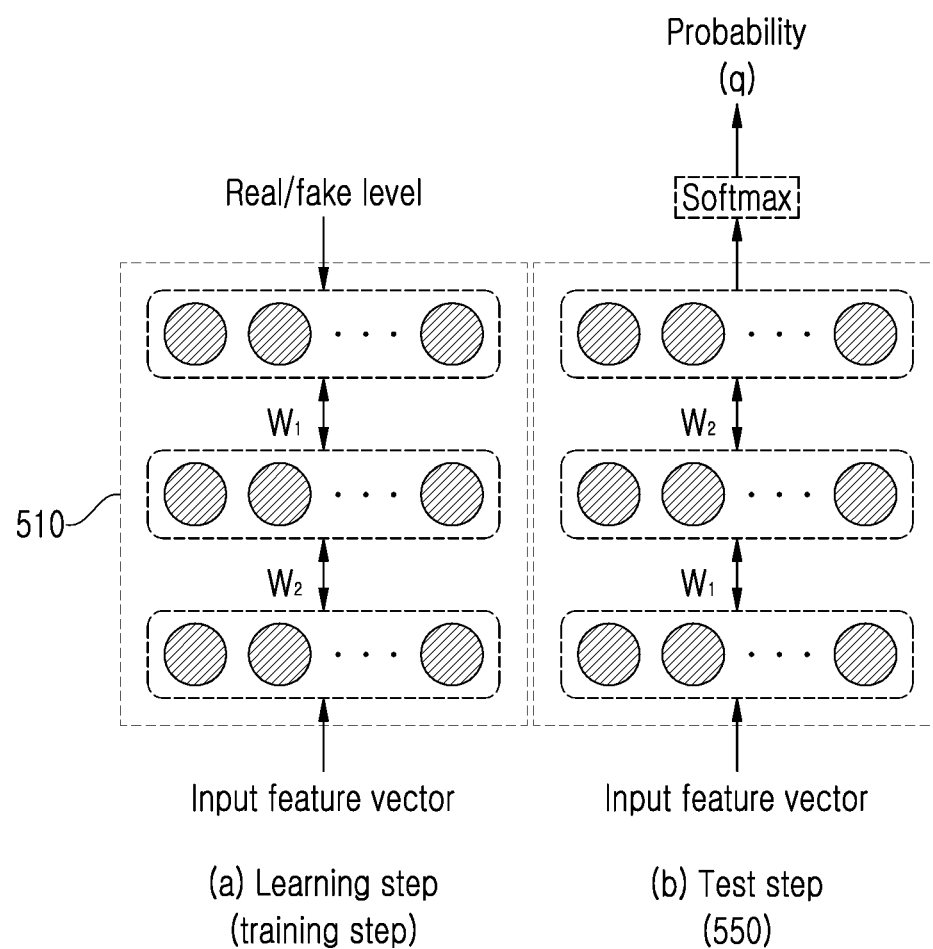
FIG. 5 is a diagram showing a structure for training a classification model in an embodiment of the present disclosure.

FIG. 5 is a diagram showing a structure for training a classification model in an embodiment of the present disclosure.

Referring to FIG. 5, the classification model training unit 220 may set labels corresponding to real data and fake data, respectively, as the output values of a classification model, may set feature vectors respectively extracted from frames forming a voice signal as an input, and may train a classification model 510.

In a test step 550, whether an input voice signal (i.e., input feature vector) corresponds to real data or fake data may be determined based on the trained classification model 510. For example, an input feature vector for a test may be set as the input to the trained classification model. Furthermore, a probabilistic value related to the input feature vector may be calculated through the softmax function before the final classification result value is output. Accordingly, whether the input voice signal corresponds to real data or fake data may be finally determined based on the calculated probabilistic value. In this case, the softmax function is normalized as a value between 0 and 1 using the input value as output and may indicate a function have a characteristic in which the sum of output values always becomes 1.

Figure 6:
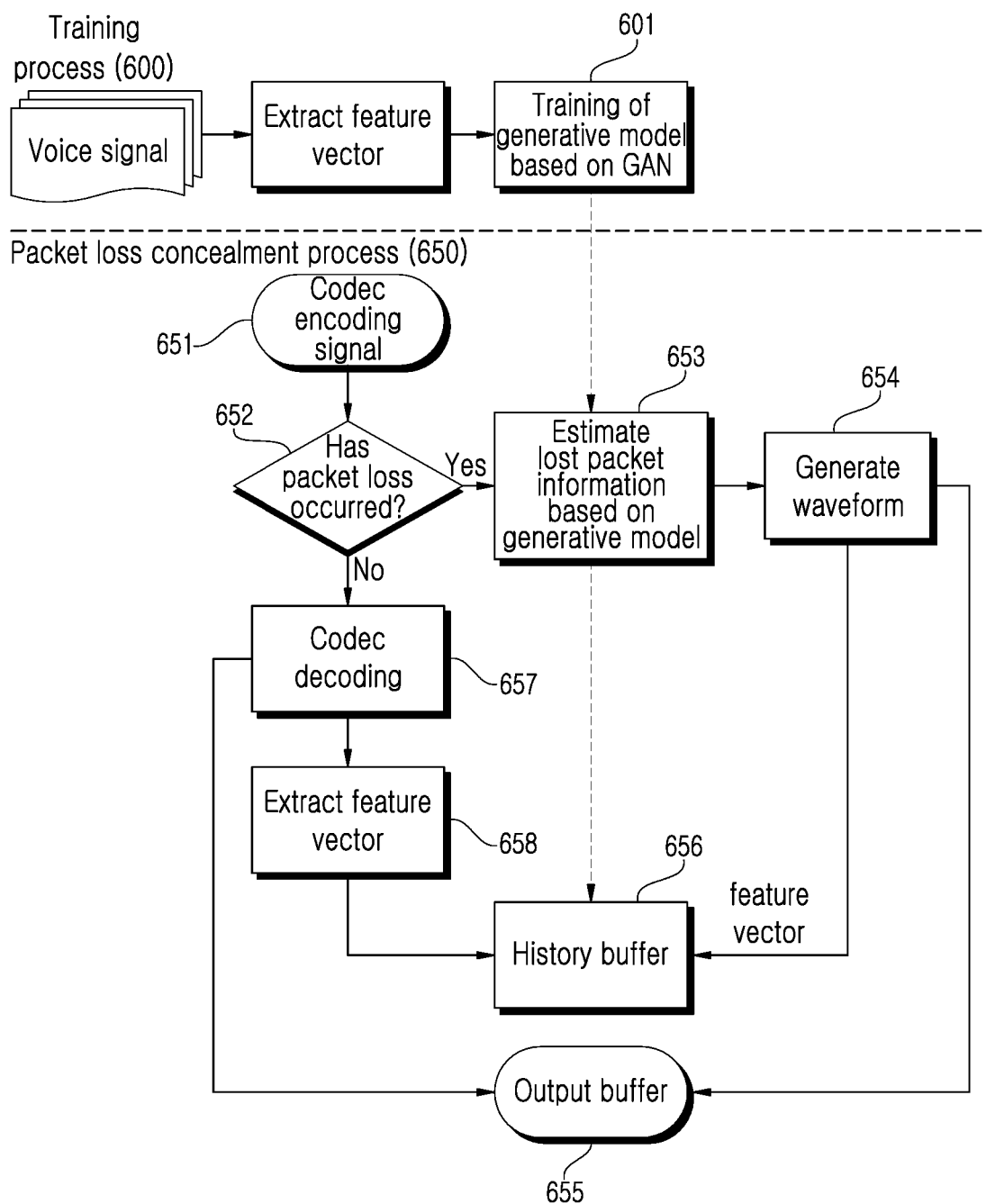
FIG. 6 is a flowchart showing a method for packet loss concealment depending on whether a packet of a voice signal has been lost in an embodiment of the present disclosure.

FIG. 6 is a flowchart showing a method for packet loss concealment depending on whether a packet of a voice signal has been lost in an embodiment of the present disclosure.

Referring to FIG. 6, the method for packet loss concealment may include a process 600 of training a neural network in order to restore a lost packet using the neural network and a packet loss concealment process 650 of restoring a lost packet when a packet loss actually occurs based on the trained neural network. The process of training the neural network has been described in detail with reference to FIGS. 4 and 5, and thus a redundant description thereof is omitted.

Referring to 600 of FIG. 6, training may be performed based on feature vectors extracted from data corresponding to a real voice signal. In this case, the training of a GAN (601) may indicate the training of both a classification model and generative model based on the GAN. That is, a generative model and a classification model may be trained based on the feature vectors. The degree of accuracy that a generative model having a contention relation restores a waveform close to a packet of the original voice signal prior to a loss when it is trained compared to previous training can be improved through the training of a classification model. That is, training performance can be improved. Accordingly, in the packet loss concealment process 650, when a packet loss occurs in a real voice signal, the lost packet can be restored based on the trained generative model.

For example, when a packet loss occurs in a voice signal 651 encoded by a codec (YES, 652), lost packet information may be estimated based on a trained generative model (653). For example, a feature vector corresponding to the lost packet (i.e., lost frame) may be estimated (or generated) based on a feature vector (i.e., an FFT coefficient and a phase) extracted from P frames prior to the loss. Furthermore, a voice signal waveform corresponding to the lost packet may be restored based on the estimated feature vector (i.e., the FFT coefficient and phase of the lost packet) (654) and finally output through an output buffer (655). In this case, the feature vector of the lost packet may be stored in a history buffer (656).

If a packet loss does not occur in the encoded voice signal 651 (NO, 652), a feature vector may be extracted from the encoded signal (658). That is, although a packet loss has not occurred in a signal (i.e., the encoded voice signal 651) corresponding to a current frame, a feature vector may be extracted from the current frame because a packet loss may occur in a next frame. Furthermore, the extracted feature vector may be stored in the history buffer (656). The voice signal encoded through the codec may be decoded (657) and finally output through the output buffer (655).

Table 1 and Table 2 are indices showing performance verification results when packet loss concealment is performed based on the GAN. Table 1 may show performance verification results through an objective index, and Table 2 may show performance verification results through a subjective index.

TABLE 1

| Packet loss rate (%) | Padding zeros | HMM-based scheme | PLC-GAN |
| --- | --- | --- | --- |
| 5 | 3.01 | 3.28 | 3.45 |
| 10 | 2.45 | 2.88 | 2.98 |
| 15 | 2.14 | 2.74 | 2.85 |
| 20 | 1.82 | 2.31 | 2.43 |

TABLE 2

| Packet loss rate (%) | Padding zeros | HMM-based scheme | PLC-GAN |
| --- | --- | --- | --- |
| 5 | 2.81 | 3.23 | 3.32 |
| 10 | 2.30 | 2.91 | 2.97 |
| 15 | 1.85 | 2.65 | 2.82 |
| 20 | 1.53 | 2.26 | 2.48 |

In Table 1, perceptual evaluation of quality (PESQ) may be used for objective performance verification. The PESQ is an objective index chiefly used to measure voice quality in a codec and has a value of −0.5 to 4.5 or higher. As the value of the PESQ is higher, it may indicate that sound quality is better. In Table 1, the padding zeros may indicate an algorithm for simply filling a lost packet with a 0 value, and the HMM-based scheme may indicate a PLC algorithm based on a hidden Markov model.

In Table 2, a mean opinion score (MOS) may be used for subjective performance verification. The MOS is most widely used as a subjective evaluation index, and may indicate a method of several persons directly scoring a voice processed by a corresponding algorithm from 1 to 5 scores by directly hearing the voice. In this case, the final performance result value may be calculated by taking an average by dividing a total score by the number of test files. As in the PESQ, as the value of the MOS is higher, it may indicate that voice quality is better.

From Table 1 and Table 2, it may be seen that voice quality of a restored waveform is the best if GAN-based packet loss concealment (PLC-GAN) is performed. As described above, in the case of the GAN-based packet loss concealment, restored voice quality can be improved compared to a case where only a generative model is trained in a deep learning-based recursive model by competitively training a classification model and a generative model having an adversarial structure. That is, packet loss concealment performance can be improved.

In accordance with the embodiments of the present disclosure, both a classification model and a generative model having a contention relation are trained using the generative adversarial network (GAN), and packet loss concealment is performed using the trained generative model. Accordingly, when a packet loss occurs in voice communication, voice call quality can be improved by compensating for the loss.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter. The hardware device may be configured in the form of one or more software modules for executing the operation of the embodiment, and the vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method for packet loss concealment in voice communication, the method comprising:
training a classification model based on a generative adversarial network (GAN) with respect to a voice signal comprising a plurality of frames;
training a generative model having a contention relation with the classification model based on the GAN;
estimating lost packet information based on the trained generative model with respect to the voice signal encoded by a codec; and
restoring a lost packet based on the estimated packet information,
wherein estimating the lost packet information comprises:
setting a specific number of previous frames predetermined prior to a target frame comprising a lost packet from among the plurality of frames as an input to the generative model,
setting the target frame as an output of the generative model, and
estimating the lost packet information.

2. The method of claim 1, wherein the classification model determines whether data corresponding to an input signal is data corresponding to a real voice signal or data corresponding to a voice signal generated through the generative model.

3. The method of claim 1, wherein training the generative model comprises training the generative model to classify data generated through the generative model as data corresponding to a real voice signal in the classification model.

4. The method of claim 3, wherein training the classification model comprises training the classification model to classify data generated through the generative model as fake data not data corresponding to a real voice signal through the training.

5. The method of claim 1, wherein training the classification model comprises training the classification model to classify data corresponding to a frame before a packet is lost as real data and classify data of a lost packet estimated based on the generative model as fake data with respect to the voice signal.

6. The method of claim 1, wherein the classification model and the generative model are trained based on a convolutional neural network.

7. A method for packet loss concealment in voice communication, the method comprising:
training a classification model based on a generative adversarial network (GAN) with respect to a voice signal comprising a plurality of frames;
training a generative model having a contention relation with the classification model based on the GAN;
estimating lost packet information based on the trained generative model with respect to the voice signal encoded by a codec; and
restoring a lost packet based on the estimated packet information,
wherein the lost packet is restored based on a fast Fourier transform (FFT) coefficient and phase extracted from each of a specific number of previous frames predetermined prior to a target frame comprising a lost packet from among the plurality of frames and the trained generative model.

8. An apparatus for packet loss concealment in voice communication, the apparatus comprising:
at least a processor configured to:
train a classification model based on a generative adversarial network (GAN) with respect to a voice signal comprising a plurality of frames by a classification model training unit;
train a generative model having a contention relation with the classification model based on the GAN by a generative model training unit; and
estimate lost packet information based on the trained generative model with respect to the voice signal encoded by a codec and restore a lost packet based on the estimated packet information,
wherein estimating the lost packet information comprises:
setting a specific number of previous frames predetermined prior to a target frame comprising a lost packet from among the plurality of frames as an input to the generative model, setting the target frame as an output of the generative model, and estimating the lost packet information.

9. The apparatus of claim 8, wherein the classification model determines whether data corresponding to an input signal is data corresponding to a real voice signal or data corresponding to a voice signal generated through the generative model.

10. The apparatus of claim 8, wherein the generative model training unit trains the generative model to classify data generated through the generative model as data corresponding to a real voice signal in the classification model.

11. The apparatus of claim 10, wherein the generative model training unit trains the classification model to classify data generated through the generative model as fake data not data corresponding to a real voice signal through the training.

12. The apparatus of claim 8, wherein the classification model training unit trains the classification model to classify data corresponding to a frame before a packet is lost as real data and to classify data of a lost packet estimated based on the generative model as fake data with respect to the voice signal.

13. The apparatus of claim 8, wherein the classification model and the generative model are trained based on a convolutional neural network.

14. The apparatus of claim 8, wherein the lost packet is restored based on a fast Fourier transform (FFT) coefficient and phase extracted from each of a specific number of previous frames predetermined prior to a target frame comprising a lost packet from among the plurality of frames and the trained generative model.

* * * * *